US010878225B2

(12) United States Patent
Nozue et al.

(10) Patent No.: US 10,878,225 B2
(45) Date of Patent: Dec. 29, 2020

(54) COMPARISON DEVICE AND COMPARISON METHOD

(71) Applicant: PANASONIC INTELLECTUAL PROPERTY MANAGEMENT CO., LTD., Osaka (JP)

(72) Inventors: Yosuke Nozue, Kanagawa (JP); Kazuki Maeno, Kanagawa (JP); Hiroaki Yoshio, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 16/470,864

(22) PCT Filed: Sep. 25, 2017

(86) PCT No.: PCT/JP2017/034421
§ 371 (c)(1),
(2) Date: Jun. 18, 2019

(87) PCT Pub. No.: WO2018/116560
PCT Pub. Date: Jun. 28, 2018

(65) Prior Publication Data
US 2019/0318160 A1 Oct. 17, 2019

(30) Foreign Application Priority Data

Dec. 21, 2016 (JP) .................................. 2016-247935

(51) Int. Cl.
*G06K 9/00* (2006.01)
(52) U.S. Cl.
CPC .............................. *G06K 9/00288* (2013.01)

(58) Field of Classification Search
CPC ........... G06K 9/00288; G06K 9/00221; G06K 9/00281; G06K 9/00268; G06K 9/00228;
(Continued)

(56) References Cited

U.S. PATENT DOCUMENTS

| 2007/0036398 | A1* | 2/2007 | Chen | ................. | G06K 9/00288 382/118 |
| 2007/0122005 | A1* | 5/2007 | Kage | ................. | G06K 9/00275 382/115 |

(Continued)

FOREIGN PATENT DOCUMENTS

JP  2000-251077  9/2000

OTHER PUBLICATIONS

International Search Report issued in International Patent Application No. PCT/JP2017/034421, dated Nov. 21, 2017.
(Continued)

*Primary Examiner* — Jingge Wu
(74) *Attorney, Agent, or Firm* — Greenblum & Bernstein, P.L.C.

(57) ABSTRACT

An imaged face image of a comparison target person is compared to a registered face image. When a comparison score indicating a result of the comparison is equal to or smaller than Th1 and it is determined that the comparison target person in the imaged face image is not a subject of the registered face image, it is determined whether or not the comparison score is equal to or greater than Th2 (Th2<Th1). When the comparison score is equal to or greater than Th2, a partial score indicating similarity between the imaged face image and a portion of the registered face image is calculated. When the calculated partial score is equal to or smaller than Th3, processing of emphasizing a portion corresponding to the partial score is performed on at least one of the imaged face image and the registered face image. The processed image is displayed.

4 Claims, 8 Drawing Sheets

(58) Field of Classification Search
CPC .. G06K 9/6215; G06K 9/6201; G06K 9/6212; G06T 2207/30196; G06T 2207/30201
See application file for complete search history.

(56) References Cited

U.S. PATENT DOCUMENTS

| | | | | |
|---|---|---|---|---|
| 2008/0192991 | A1* | 8/2008 | Gremse | G06K 9/00288 382/118 |
| 2010/0316265 | A1* | 12/2010 | Nakanowatari | G06K 9/00288 382/118 |
| 2014/0104313 | A1* | 4/2014 | Matsumoto | H04N 5/23219 345/632 |
| 2014/0247963 | A1* | 9/2014 | Lin | G06K 9/6202 382/103 |
| 2014/0247993 | A1* | 9/2014 | Lin | G06K 9/00281 382/195 |
| 2016/0350598 | A1* | 12/2016 | Yamaji | G06K 9/00221 |
| 2018/0225506 | A1* | 8/2018 | Lambert | G06K 9/00926 |
| 2018/0373859 | A1* | 12/2018 | Ganong | G06F 21/32 |
| 2019/0205620 | A1* | 7/2019 | Yi | G06K 9/6262 |
| 2019/0362137 | A1* | 11/2019 | Wang | G06K 9/00926 |

OTHER PUBLICATIONS

U.S. Appl. No. 16/306,198 to Yosuke Nozue et al., which was filed on Nov. 30, 2018.

* cited by examiner

| PARTIAL SCORE | LOW | MID | HIGH |
|---|---|---|---|
| DEGREE OF HIGHLIGHTING 1 (LIGHT) TO 3 (DENSE) | 3 | 2 | 1 |

FIG. 10
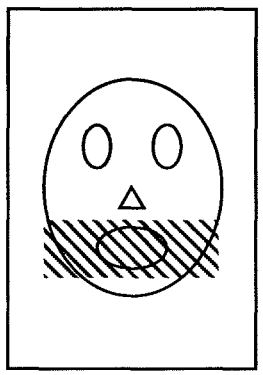
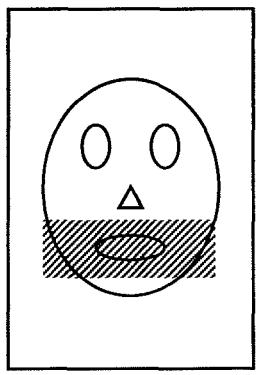
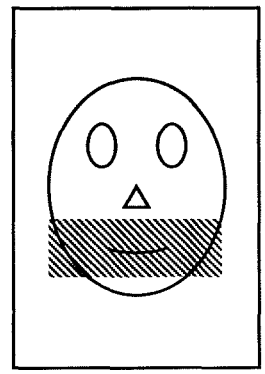
IMAGED FACE IMAGE
(OPENED MOUTH)
PARTIAL SCORE OF MOUTH: LOW
DEGREE OF HIGHLIGHTING: DENSE
IMAGED FACE IMAGE
(OPENED MOUTH)
PARTIAL SCORE OF MOUTH: MID
DEGREE OF HIGHLIGHTING: MID
IMAGED FACE IMAGE
(SMILE)
PARTIAL SCORE OF MOUTH: HIGH (SMALLER THAN Th3)
DEGREE OF HIGHLIGHTING: LIGHT

COMPARISON DEVICE AND COMPARISON METHOD

TECHNICAL FIELD

The disclosure relates to a comparison device and a comparison method for comparing an imaged face image to a registered face image.

BACKGROUND ART

For example, in a comparison device provided in an airport or the like, a person is verified by comparing a face image of the person, which is imaged by a camera, to a face image registered in a passport. In practice, this type of comparison device detects the feature value of a registered face image and the feature value of an imaged face image, calculates a score indicating similarity between the feature values, and authenticates whether or not the person is a registered person, based on the calculated score.

In a case where a comparison target person imaged by a camera puts an ornament such as eyeglasses or a mask on, or in a case where the facial expression or the hair style of the comparison target person changes at the moment of imaging, an authentication result that the comparison target person is not a registered person may be obtained even though the comparison target person is the registered person, and this is inconvenient.

Here, PTL 1 discloses a technology of detecting that an imaged person puts a blocking object such as a mask on.

CITATION LIST

Patent Literature

PTL 1: Japanese Patent Unexamined Publication No. 2000-251077

SUMMARY OF THE INVENTION

Technical Problem

In the technology disclosed in PTL 1, simply, a blocking object is detected based on an imaged face image, and a financial transaction is canceled in a case where a blocking object is detected. This technology has not been achieved for comparison. That is, if a blocking object is detected from an imaged face image, processing may be suspended regardless of a registered face image.

In a case where the technology in PTL 1 is applied to a comparison device, if it is determined that a comparison target person is not the principal, comparison processing is immediately suspended. However, in many cases, a comparison target person holds an ornament such as eyeglasses or a mask, or the facial expression or the hair style changes in a moment. Thus, it is very inconvenient to immediately suspend comparison processing in such a case.

According to an aspect of the disclosure, there are provided a comparison device and a comparison method in which it is possible to reduce an occurrence of a concern of determining a comparison target person not to be the principal even though the comparison target person is the principal.

Solutions to Problem

According to the disclosure, a comparison device includes a processor, a storage unit, and a display unit. The processor compares an imaged face image obtained by imaging the face of a comparison target person to a registered face image registered in the storage unit. In a case where a comparison score indicating a result of the comparison is equal to or smaller than Th1 and it is determined that the comparison target person in the imaged face image is not a subject of the registered face image, the processor determines whether or not the comparison score is equal to or greater than Th2 (Th2<Th1). In a case where the comparison score is equal to or greater than Th2, and in a case where a partial score indicating similarity between the imaged face image and a portion of the registered face image is calculated, and the calculated partial score is equal to or smaller than Th3, the processor performs processing of emphasizing the portion corresponding to the partial score on at least one of the imaged face image and the registered face image and displays the image subjected to the processing, in the display unit.

Advantageous Effect of Invention

According to the disclosure, it is possible to reduce the occurrence of a concern of determining a comparison target person not to be the principal even though the comparison target person is the principal.

BRIEF DESCRIPTION OF DRAWINGS

FIG. 10 is a diagram illustrating a result of the highlighting processing.

DESCRIPTION OF EMBODIMENT

Figure 1:
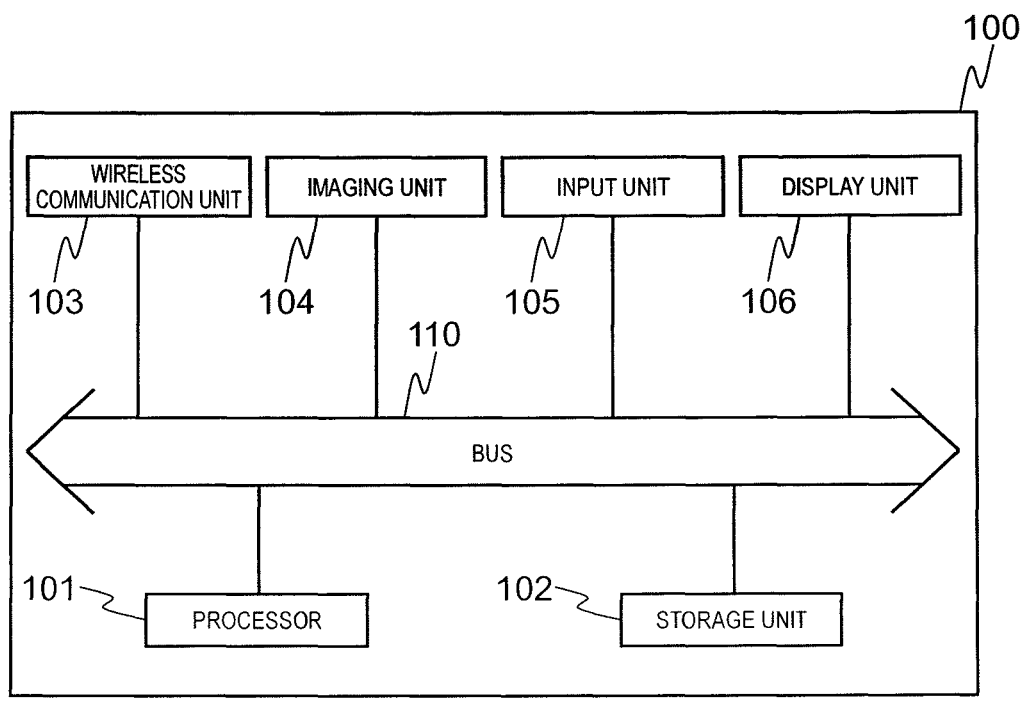
FIG. 1 is a block diagram illustrating an overall configuration of a comparison device according to an exemplary embodiment.

Hereinafter, an exemplary embodiment will be described in detail while appropriately referring to the drawings. Detailed descriptions more than necessary may be omitted. For example, the detailed descriptions of the well-known item and redundant descriptions of substantially the same component may be omitted. This is for avoiding the unnecessary redundancy of the following descriptions and for facilitating understanding by those skilled in the art.

It is noted that the accompanying drawings and the following descriptions are provided to enable those skilled in the art to sufficiently understand the present disclosure, and are not intended to limit the claimed subject by the drawings and the descriptions.

Exemplary Embodiment 1

Exemplary Embodiment 1 will be described below with reference to FIGS. 1 to 10.

1-1. Configuration

FIG. 1 is a block diagram illustrating an overall configuration of a comparison device according to an exemplary embodiment. Comparison device 100 is applied to a gate opening and closing system of an airport, for example. In the gate opening and closing system, comparison device 100 compares whether a comparison target person attempting to pass through a gate is a subject registered in a passport. In a case of being authenticated to be a subject, a gate is opened. In a case of being not authenticated, the gate is closed.

In comparison device 100, processor 101, storage unit 102, wireless communication unit 103, imaging unit 104, input unit 105, and display unit 106 are connected to each other through bus 110.

Processor 101 performs the overall processing of comparison device 100, which includes face authentication processing by comparison device 100 and display processing for display unit 106.

A registered image is stored in storage unit 102. The registered image is stored in storage unit 102 through input unit 105. Input unit 105 is, for example, a scanner, and reads a face image to be registered in a passport.

Wireless communication unit 103 wirelessly receives a detection result of a human body sensor in the gate opening and closing system. Comparison device 100 controls a display timing for display unit 106 and an imaging timing of imaging unit 104, and the like based on the detection result of the human body sensor. If it is authenticated that the comparison target person is a registered subject by comparison device 100, wireless communication unit 103 wirelessly transmits a message indicating this to a gate opening and closing control unit. Thus, the gate is controlled to be opened.

Imaging unit 104 includes a camera and images a face image of a comparison target person in front of the gate.

The face image of a comparison target person, which has been imaged by imaging unit 104 and a face image of the comparison target person before imaging are displayed in display unit 106. An instruction regarding imaging is displayed in display unit 106.

1-2. Operation

Figure 2:
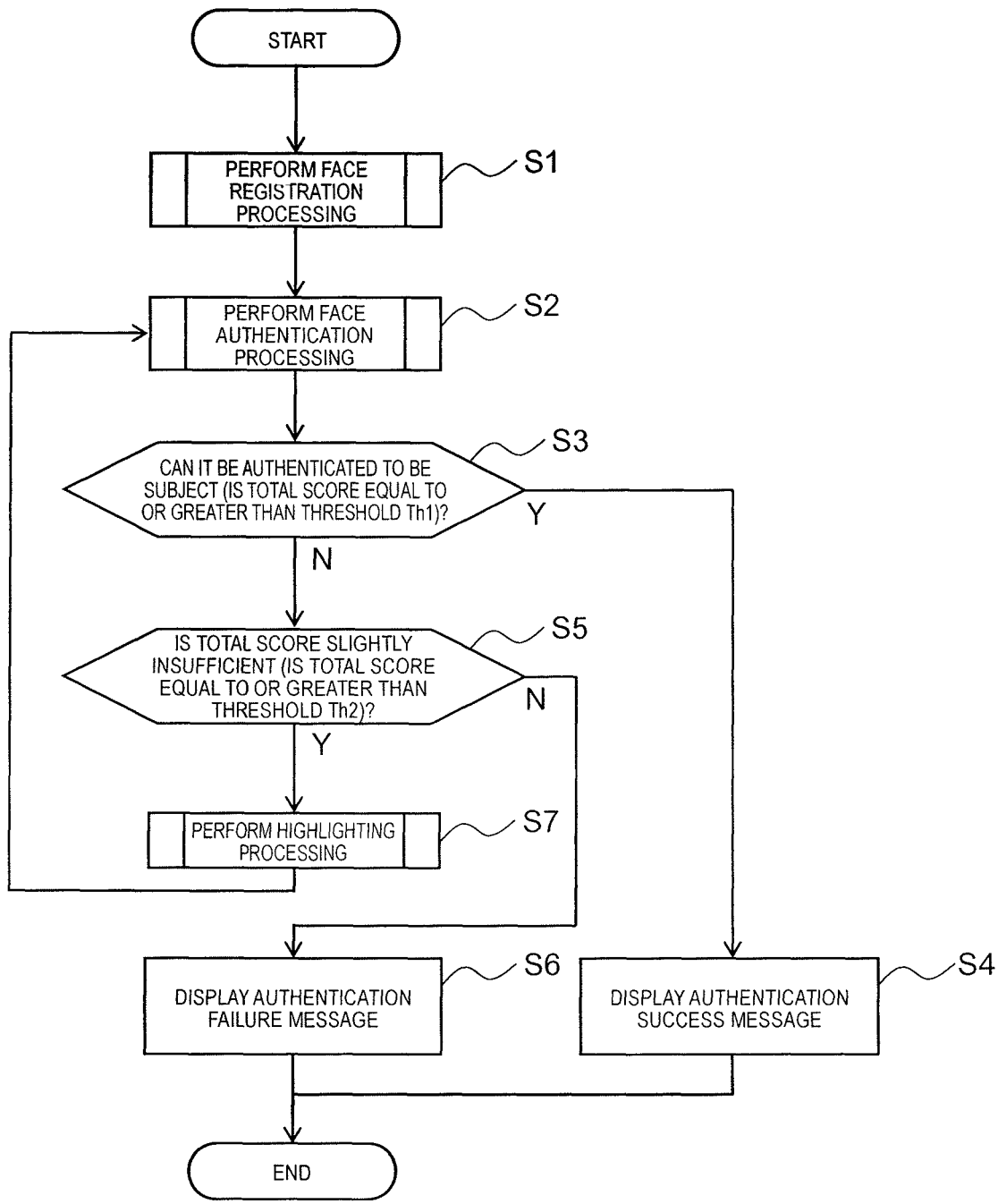
FIG. 2 is a flowchart illustrating comparison processing.

FIG. 2 is a flowchart illustrating comparison processing performed by comparison device 100.

If comparison device 100 starts the comparison processing, comparison device 100 performs face registration processing in Step S1 and performs face authentication processing in Step S2. The face registration processing in Step S1 is performed by inputting, for example, a face image of a passport through input unit 105 and storing the face image in storage unit 102. The face authentication processing in Step S2 is performed by processor 101 in a manner that the processor calculates a score indicating similarity between the face image imaged by imaging unit 104 and the face image registered in storage unit 102 in Step S1 and performs determination between the score and a threshold.

Figure 3:
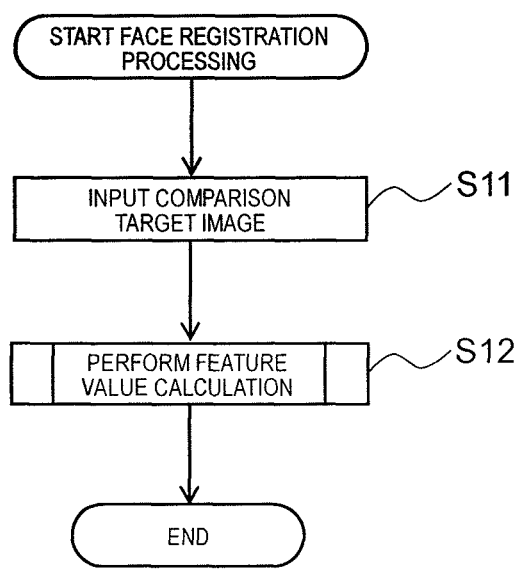
FIG. 3 is a flowchart illustrating face registration processing.

FIG. 3 is a flowchart illustrating processing details of the face registration processing performed in Step S1 in FIG. 2. As illustrated in FIG. 3, in the face registration processing (Step S1), comparison device 100 inputs a face image desired to be registered, through input unit 105 in Step S11. The comparison device stores the face image to be registered in storage unit 102. In Step S12, processor 101 calculates the feature value of the registered face image.

Figure 4:
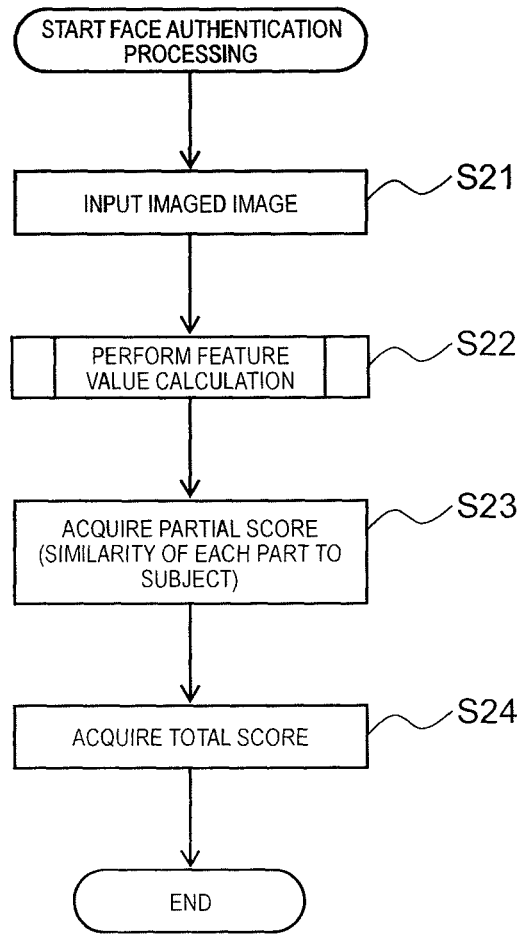
FIG. 4 is a flowchart illustrating face authentication processing.

FIG. 4 is a flowchart illustrating processing details of the face authentication processing performed in Step S2 in FIG. 2. As illustrated in FIG. 4, in the face authentication processing (Step S2), in comparison device 100, firstly, an imaged face image imaged by imaging unit 104 is input in Step S21. In Step S22, processor 101 calculates the feature value of the imaged face image. The feature value is a feature value of the same type as the feature value used in Step S12. In Step S23, processor 101 acquires a partial score (similarity of each part) through calculation. Specifically, the processor calculates similarity (=partial score) of each partial area by using normalized correlation or the like, based on the feature value of a partial area of the registered face image and the feature value of the partial area of the imaged face image. For example, as an example of similarity of each partial area, similarity S_reye (=partial score of right eye) of the right eye can be obtained by normalized correlation of the following expression, when the feature value of the right eye obtained from the registered face image is set as D_reye_regist, and the feature value of the right eye obtained from the imaged face image is set as D_reye_verify.

[Expression 1]

$$Sreye = \frac{Dreye_{regist}^T \cdot Dreye_{verify}}{\|Dreye_{regist}\| \|Dreye_{verify}\|} \quad (1)$$

In Step S24, processor 101 acquires the total score through calculation by using the partial score. For example, the total score can be obtained by an average of partial scores of the forehead, the right eye, the left eye, the nose, and the mouth or by summation of the partial scores. For example, when the partial area is set as P, and similarity of a partial area p is set as S_p, the total score S_all can be obtained by the average as with the following expression.

[Expression 2]

$$Sall = \frac{1}{P}\sum_{p=0}^{P} S_p \quad (2)$$

Figure 5:
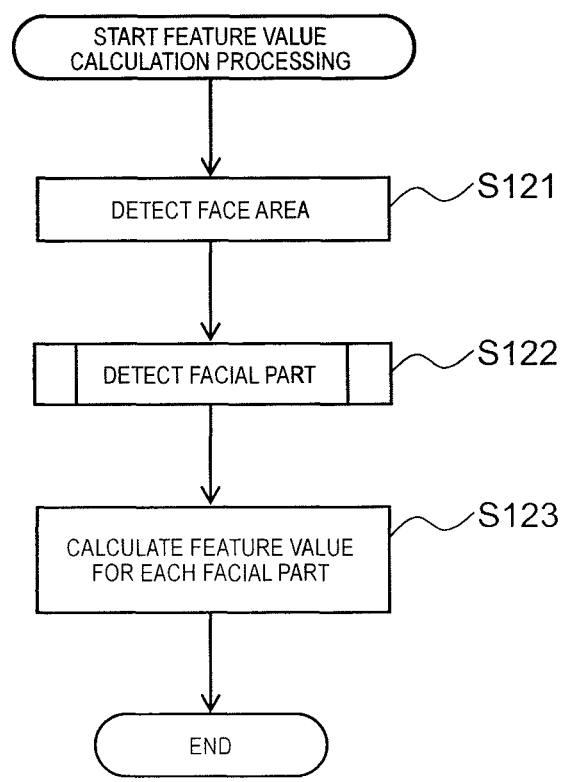
FIG. 5 is a flowchart illustrating feature value calculation processing.
Figure 6:
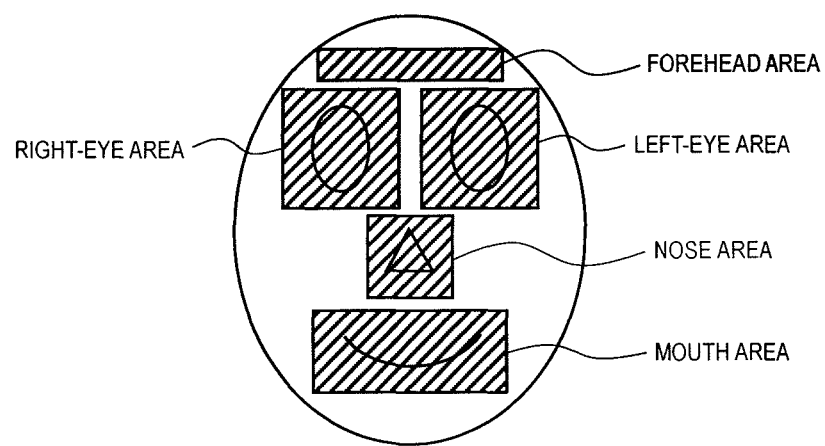
FIG. 6 is a diagram for describing a facial part (partial area).
Figure 7:
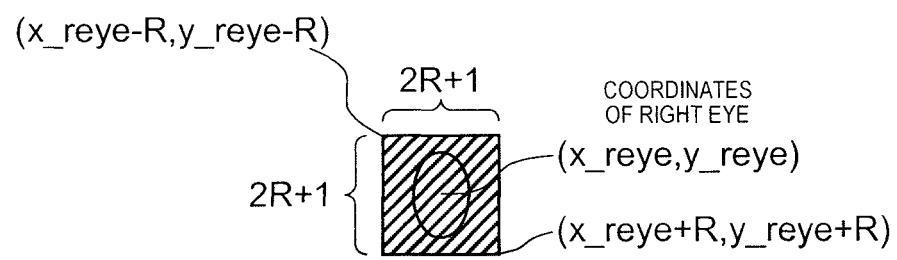
FIG. 7 is a diagram for describing the facial part (partial area).

FIG. 5 is a flowchart illustrating processing details of feature value calculation processing performed in Step S12 in FIG. 3 and Step S22 in FIG. 4. In the feature value calculation processing, in Step S121, processor 101 detects a face area from an image. At this time, the face area can be detected, for example, by using Haar-like features and a learning algorithm by boosting. In Step S122, the processor detects a partial area from the face area detected in Step S121. As an example of a method of detecting the partial area from the face area, the known method can be used. In the exemplary embodiment, the processor detects the partial area from the face area by using Random-Forest regression. The method of detecting a partial area from the face area is not limited to Random-Forest regression, and other regression methods, machine learning, or the like may be used. As illustrated in FIG. 6, the partial area is a component constituting the face, such as a left-eye area, a right-eye area, a nose area, a mouth area, and a forehead area. As illustrated in FIG. 7, for example, the right-eye area is a rectangular area of a radius R which is based on the coordinates of the right eye as the center, when the coordinates of the right eye are set to be (x_reye, y_reye). In Step S123, the processor calculates the feature value of each partial area. An example of the method of calculating the feature value will be described. For example, the processor selects any N points in the right-eye area. The number N of points satisfies $N \geq 1$ and $N \leq 4R^2+4R+1$. The processor extracts a SIFT feature value in 128 dimensions from the points and sets the extracted feature value to be the feature value D_reye of the right-eye area. Thus, the number of dimensions of the features D_reye in the right-eye area is $N \times 128$.

In Step S3, if the total score is equal to or greater than threshold Th1, processor 101 determines that the comparison target person is a subject (YES in Step S3). If processor 101 determines that the comparison target person is the subject in Step S3, the process proceeds to Step S4. In Step S4, processor 101 displays an authentication success message (that is, indicating that a person of the imaged face image is the same as a person of the registered face image) in display unit 106. However, if the total score is smaller than threshold Th1 in Step S3 (NO in Step S3), processor 101 causes the process to proceed to Step S5.

In Step S5, processor 101 determines whether or not the total score is equal to or greater than threshold Th2. Here, threshold Th2 is smaller than threshold Th1, that is, Th2<Th1 is satisfied. In a case where the processor determines that the total score is smaller than threshold Th2 (NO in Step S5), processor 101 causes the process to proceed to Step S6 from Step S5, and displays an authentication failure message (that is, indicating that the person of the imaged face image is different from the person of the registered face image) in display unit 106. However, if the total score is equal to or greater than threshold Th2, processor 101 determines that there is a possibility of the person being the subject, and causes the process to proceed to Step S7 without immediately displaying the authentication failure message. That is, in a case of Th2≤total score<Th1 (case where, regrettably, the total score does not reach Th1), the processor does not immediately determine that the authentication has failed. The reason is that, in a case where, regrettably, the total score does not reach Th1, there is a possibility of the score decreasing in spite of being the subject, due to any cause, for example, a blocking object being provided.

In Step S7, processor 101 performs highlighting processing. Details of highlighting processing will be described with reference to FIG. 8.

Figures 8, 9:
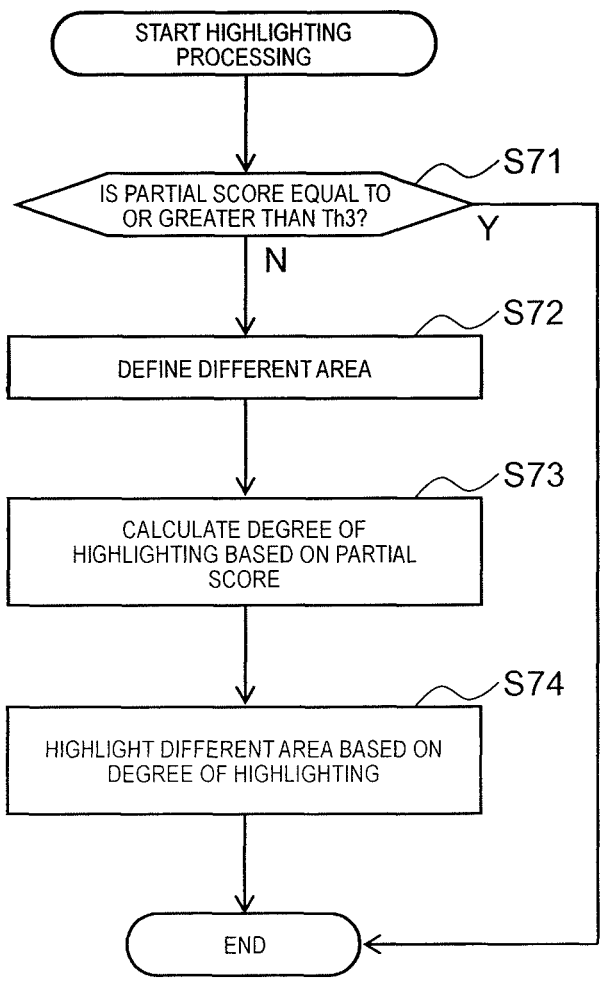
FIG. 8 is a flowchart illustrating highlighting processing.
FIG. 9 is a diagram illustrating an example in which a level of a partial score and a degree of highlighting are associated with each other.

FIG. 8 is a flowchart illustrating highlighting processing.

In Step S71, processor 101 determines whether or not the partial score is equal to or greater than threshold Th3. Specifically, processor 101 determines whether or not some or all of partial scores acquired in S23 are equal to or greater than Th3. In a case where all the partial scores are equal to or greater than Th3 (Yes in Step S71), the highlighting processing ends.

In a case where there is the partial score which is smaller than Th3, processor 101 defines that the partial area having the partial score calculated in S72 is a different area.

In Step S73, processor 101 calculates the degree of highlighting based on the partial score. The degree of highlighting means the degree of emphasis when the partial area is characterized and displayed. Various methods are considered as a method of calculating the degree of highlighting. One is a method of setting all partial areas having a partial score which is smaller than Th3 to have the same degree of highlighting. As another method, the level of the partial score may be associated with the degree of highlighting. An example in which the level of the partial score is associated with the degree of highlighting will be described with reference to FIG. 9.

FIG. 9 is a diagram illustrating an example in which the level of the partial score and the degree of highlighting are associated with each other. In the example illustrated in FIG. 9, the degree of the emphasis increases as the partial score becomes smaller.

In a case where the partial score is very small even though, regrettably, the total score does not reach the threshold (Th1), a possibility of any artificial change occurring in the partial area as a source for calculating the partial score is high. The artificial change includes a change occurring by putting an ornament on or a change occurring by an action such as opening of the mouth or closing of the eyes. The artificial change can be removed by efforts of the comparison target person. Since the degree of highlighting increases as the partial area becomes smaller, it is possible to reliably alert the comparison target person to remove the artificial change. Thus, in this manner, it is possible to reliably perform comparison.

In Step S74, processor 101 highlights the different area based on the degree of highlighting. FIG. 10 is a diagram illustrating a result of the highlighting processing. In FIG. 10, imaged face images in which partial scores for the mouth are different from each other are displayed with highlighted in different manner in display unit 106. As illustrated in FIG. 10, shading is more strongly performed over the mouth as the partial score of the mouth becomes smaller. Means for performing highlighting is not limited to the example illustrated in FIG. 10. For example, in FIG. 10, highlighting is performed by processing an image in the partial area which is a source for calculating the partial score. However, the partial area may be highlighted by processing an image other than the partial area. In FIG. 10, shading is performed as an example of processing an image. However, highlighting can be performed by blurring with a smoothing filter, reducing a luminance value, or displaying a mark like X as an example of processing the image.

Hitherto, various exemplary embodiments are described with reference to the drawings. However, the disclosure is not limited to the above-described example. According to those skilled in the related art, it is obvious that various alternations or modifications may be conceived within the scope described in the claims, and it is appreciated that the alternations or modifications belong to the technical scope of the disclosure as well. The components in the exemplary embodiment may be randomly combined in a range without departing from the gist of the disclosure.

In the above-described exemplary embodiment, a case where the comparison device and the comparison method in the disclosure are applied to a gate opening and closing system is described. However, the comparison device and the comparison method in the disclosure may also be applied to systems other than the gate opening and closing system. Of course, the registered face image is not limited to an image in a passport.

1-3. Advantageous Effects and Like

As described above, in the exemplary embodiment, the comparison device in the disclosure includes the processor, the storage unit, and the display unit. The processor compares an imaged face image obtained by imaging the face of a comparison target person to a registered face image registered in the storage unit. In a case where a comparison score indicating a result of the comparison is equal to or smaller than Th1 and it is determined that the comparison target person in the imaged face image is not a subject of the registered face image, the processor determines whether or not the comparison score is equal to or greater than Th2 (Th2<Th1). In a case where the comparison score is equal to or greater than Th2, and in a case where a partial score indicating similarity between the imaged face image and a portion of the registered face image is calculated, and the calculated partial score is equal to or smaller than Th3, the processor performs processing of emphasizing the portion corresponding to the partial score on at least one of the imaged face image and the registered face image and displays the image subjected to the processing, in the display unit.

The expression that the comparison score is equal to or greater than Th2 means that a possibility of the comparison target person being the principal is equal to or greater than a predetermined value. In such a case, more appropriate comparison may be performed by improving the factor of locally decreasing the comparison score. That is, regarding the face of a person, it is easy to artificially change an appearance by putting an ornament on, opening the mouth, closing the eyes, or the like. If the person is notified of such a change, it is easy to remove the change. In the disclosure, since the factor of locally decreasing the comparison score is determined by the partial score, and the processing of emphasizing a part of the face, it is possible to notify the comparison target person of the change of the appearance, which occurs by putting an ornament on, opening the mouth, or closing the eyes. In the above-described manner, according to the disclosure, in the comparison device, it is possible to reduce the occurrence of a concern of determining a comparison target person not to be the principal even though the comparison target person is the principal.

Other Exemplary Embodiments

As described above, Exemplary Embodiment 1 is described as an example of the technology disclosed in this application. However, the technology in the disclosure is not limited thereto, and can be applied to exemplary embodiments obtained by appropriately modifying, substituting, adding, or omitting the above exemplary embodiment. A new exemplary embodiment can be obtained by combining the components described in Exemplary Embodiment 1.

The above-described exemplary embodiment is provided for exemplifying the technology in the disclosure. Thus, various modifications, substitutions, additions, omissions, and the like can be made in the scope of claims or the equivalent thereof.

INDUSTRIAL APPLICABILITY

The disclosure is suitable for a comparison device and a comparison method of comparing an imaged face image to a registered face image.

REFERENCE MARKS IN THE DRAWINGS

100 COMPARISON DEVICE
101 PROCESSOR
102 STORAGE UNIT
103 WIRELESS COMMUNICATION UNIT
104 IMAGING UNIT
105 INPUT UNIT
106 DISPLAY UNIT

The invention claimed is:

1. A comparison device comprising:
a processor;
a storage unit; and
a display unit,
wherein the processor
compares an imaged face image obtained by imaging a face of a comparison target person to a registered face image registered in the storage unit,
determines whether or not the comparison score is equal to or greater than Th2 (Th2<Th1), in a case where a comparison score indicating a result of the comparison is equal to or smaller than Th1 and it is determined that the comparison target person in the imaged face image is not a subject of the registered face image,
calculates a partial score indicating similarity between the imaged face image and a portion of the registered face image in a case where the comparison score is equal to or greater than Th2, and
performs processing of emphasizing a portion corresponding to the partial score on at least one of the imaged face image and the registered face image and displays the image subjected to the processing in the display unit, in a case where the calculated partial score is equal to or smaller than Th3.

2. The comparison device of claim 1,
wherein a degree of the emphasis is changed based on the partial score.

3. A comparison method comprising:
by a processor,
comparing an imaged face image obtained by imaging a face of a comparison target person to a registered face image registered in a storage unit and outputting a result of the comparison,
wherein the processor
determines whether or not the comparison score is equal to or greater than Th2 (Th2<Th1), in a case where a comparison score indicating a result of the comparison is equal to or smaller than Th1 and it is determined that the comparison target person in the imaged face image is not a subject of the registered face image,
calculates a partial score indicating similarity between the imaged face image and a portion of the registered face image in a case where the comparison score is equal to or greater than Th2, and
performs processing of emphasizing the portion corresponding to the partial score on at least one of the imaged face image and the registered face image, in a case where the calculated partial score is equal to or smaller than Th3.

4. The comparison method of claim 3,
wherein a degree of the emphasis is changed based on the partial score.

* * * * *